United States Patent [19]

Langenbach et al.

[11] 4,097,733
[45] Jun. 27, 1978

[54] DOOR SECURING LIGHT BARRIER

[75] Inventors: Erwin Langenbach, Waldkirch-Buchholz; Karl-Hans Sackmann, Erzgrube, both of Germany

[73] Assignee: Erwin Sick Gesellschaft mit beschrankter Haftung Optik-Elektronik, Waldkirch, Germany

[21] Appl. No.: 728,073

[22] Filed: Sep. 30, 1976

[30] Foreign Application Priority Data

Oct. 29, 1975 Germany .............................. 2548465

[51] Int. Cl.² .......................................... G01D 21/04
[52] U.S. Cl. .................................... 250/221; 250/239
[58] Field of Search ................... 250/221, 222 R, 239; 340/258 B

[56] References Cited

U.S. PATENT DOCUMENTS

| | | | |
|---|---|---|---|
| 2,922,992 | 1/1960 | Witcher | 340/258 B |
| 3,360,654 | 12/1967 | Muller | 250/221 |
| 3,488,510 | 1/1970 | Raymond et al. | 250/222 R |
| 3,500,063 | 3/1970 | Reno et al. | 250/222 R X |
| 3,752,978 | 8/1973 | Kahl | 250/221 X |

*Primary Examiner*—James B. Mullins

[57] ABSTRACT

A door securing light barrier with a plurality of optically active devices, between which the light barrier beam extends through at least part of the door opening and whereof one emits an electrical signal when the light barrier beam is broken, the angle of the light beam of the light beam emitting device being adjustable relative to a fixed casing.

14 Claims, 4 Drawing Figures

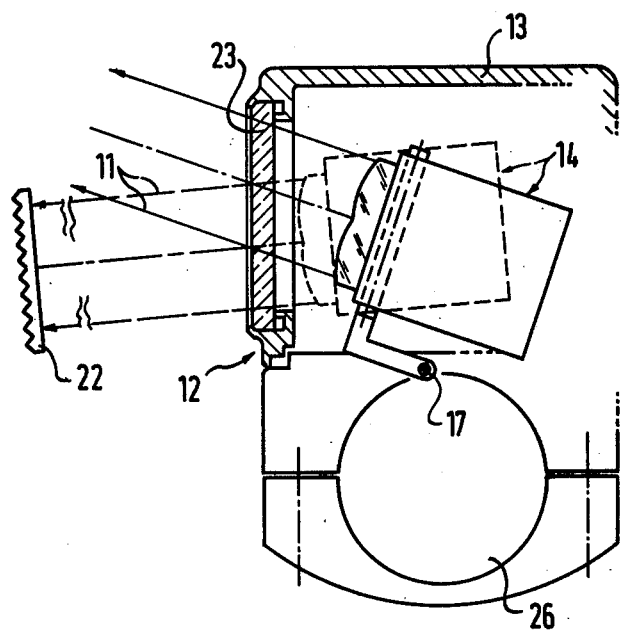
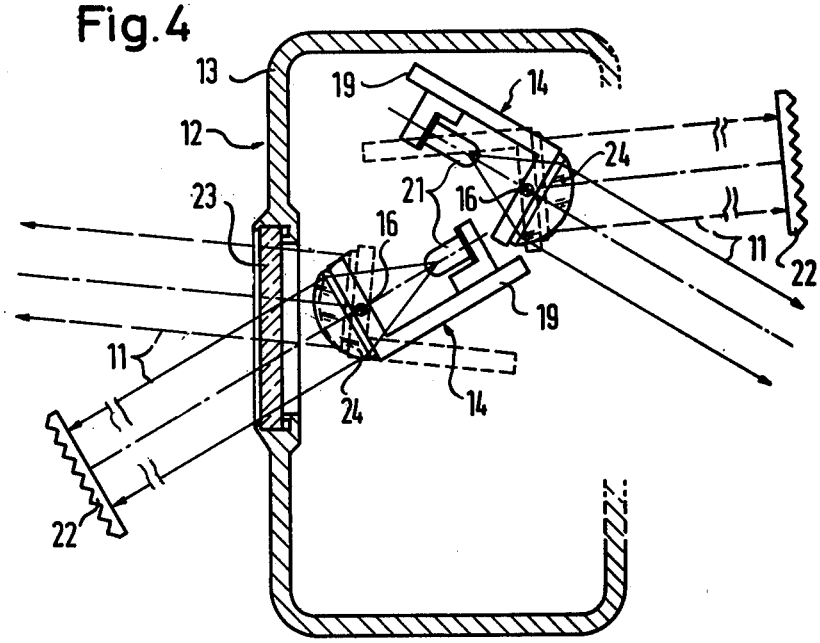

DOOR SECURING LIGHT BARRIER

BACKGROUND OF THE INVENTION

The invention relates to a door securing light barrier with a plurality of optically active devices, between which the light barrier beam extends through at least part of the door opening and whereof one emits an electrical signal when the light barrier beam is broken.

Light barriers of this type are, for example, provided on handrails in trams and buses in such a way that the light beam thereof can be adjusted by rotating the apparatus about the handrail or by sliding the apparatus along the handrail. If several light beams are required in different directions, then a plurality of electrically interconnected apparatuses are arranged in superimposed manner on the handrail.

Normally the apparatuses provided on the handrail have a light transmitter and a light receiver combined together according to the autocollimation principle, whereby the optically active device provided at the other end of the light barrier beam is a retroreflector, e.g. a triple reflector.

A problem with such door securing light barriers is the precise relative alignment of the optically active devices. Although the movement or turning of the whole apparatus on the handrail permits a coarse adjustment, fine adjustment proves difficult due to the relatively large mass moved. Adjustment by sliding the complete apparatus becomes completely impossible if simultaneously light beams are emitted in two different, preferably opposite directions. In this case a precise adjustment is only possible for one of the light barrier beams.

BRIEF SUMMARY OF THE INVENTION

The problem of the invention is therefore to provide a door securing light barrier of the type indicated hereinbefore which is particularly well suited for use on the handrails of public service vehicles and for cooperating with a retroreflector, whereby the adjustment of the optically active devices relative to one another is still easily possible if more than one light transmitter and one light receiver are provided in a casing.

According to the invention, this problem is solved in that the angle of the light beam of the light beam emitting device is adjustable relative to the fixed casing. Thus, according to the invention, the casing is completely fixed whilst only the light beam is movable for adjustment purposes. Thus, only a coarse adjustment is required by means of the casing, whereas the fine adjustment of the light beam takes place by angular adjustment thereof on the retroreflector arranged at the other side of the door opening. The angular range is advantageously approximately 40° heightwise and approximately 30° laterally. However, depending on requirements, other adjustment angular ranges can be provided.

According to a first practical embodiment the light transmitter is fixed in the casing and the light beam is removed from the casing by means of a pivotable passive reflector. Advantageously the passive reflector is pivotable about two perpendicular axes and is preferably mounted in a ball and socket joint. The light transmitter emits a light beam which is substantially perpendicular to the light barrier beam and which is deflected by substantially 90° by the passive reflector. In this construction, advantageously two light transmitters and passive reflectors are juxtaposed and emit in opposite directions.

According to a further embodiment, a third transmitting and receiving system between the two transmission and receiving systems associated with the passive reflector emits from the casing vertically and without deflection and strikes the associated reflector on the vehicle roof or the upper limit of the door. Thus, protection is also provided in the closing area of the doors, e.g. when holding the handrail without being located in the door or step area.

This leads to a space-saving construction because the light transmitters formed from the light source and condenser which for example emit vertically from bottom to top can be juxtaposed and take up little space. It is also possible in space-saving manner to juxtapose the two passive reflectors and the ball and socket joints which carry the same. The advantage of this embodiment is that the facing light emission windows extending to opposite sides can be located at the same level.

According to a further embodiment, the light transmitter is pivotably arranged in the casing, whereby it can be pivoted about two perpendicular spindles and is preferably mounted in a ball and socket joint. The simplest procedure is to secure the light transmitter to a pivotable plate.

As a result of this construction one passive reflector can be omitted which however due to its limited mass can be adjusted somewhat more easily and precisely.

As has already been stated, the invention is more particularly used in conjunction with light barriers in which the light transmitter is combined with a light receiver in an autocollimation system and the second optically active device is a retroreflector. In this case the light transmitter and receiver, except for the provision of a separate light source and a separate photoreceiver, are identical with one another and can either both be movable or both fixed.

In the case of the embodiment with pivotable light transmitters, it is once again advantageous to arrange in a casing two light transmitters which emit to opposite sides as well as a vertically upwardly directed light transmitter and receiver, which can be adjusted independently of one another due to the construction according to the invention.

Despite the adjustment possibilities provided by the invention, the casing is preferably arranged on a pole in such a way that its height can be adjusted and it can be pivoted about the pole axis so that prior to the fine adjustment a coarse adjustment is possible.

In the rotation range of the light barrier beams the casing is preferably closed by windows which can be constructed as filters so that when light bulbs are used as the light source the light beam can be made inconspicuous.

In the case of the pivotable construction of the light transmitter and optionally the light receiver, the two light transmitters are superimposed for space-saving reasons, whereby the light emergence openings are also staggered heightwise.

BRIEF DESCRIPTION OF THE DRAWINGS

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made if desired by those skilled in the art without departing from the invention and the scope of the appended claims. In the drawings show:

FIG. 3, a schematic horizontal section of a further advantageous advantageous embodiment of the light barrier according to the invention;

FIG. 4, a vertical median longitudinal section of the embodiment of FIG. 3.

DETAILED DESCRIPTION OF THE PREFERRED EMBODIMENTS

Figure 1:
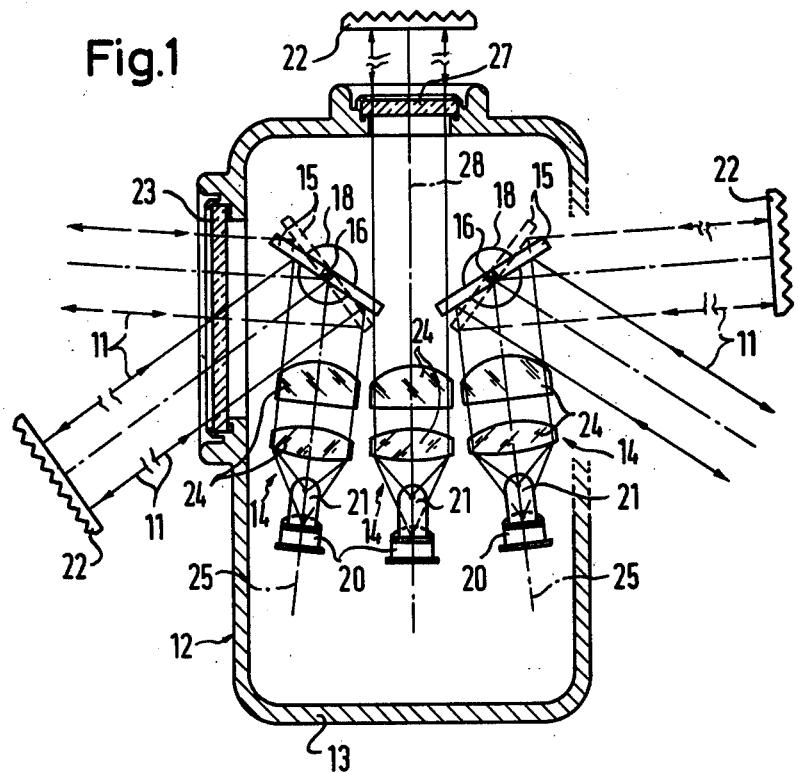
FIG. 1, a schematic vertical median section of a first embodiment of the door securing light barrier according to the invention.

According to FIG. 1, one of the two optically active devices provided at the end of the light barrier beam 11 comprises a casing 13 in which are juxtaposed three light transmitters 14 which in each case comprise a light source 21 and a condenser system 24 and whose optical axes 25 are substantially vertical, but in the represented manner are tilted slightly inwards relative to the vertical.

According to the invention, above the lateral light transmitters 14 are provided planar passive reflectors 15 which by means of ball and socket joints 18 can be pivoted in a predetermined angular range about a horizontal spindle 16 and a vertical spindle 17. According to FIG. 1, the pivot angle in the vertical direction is approximately 40° and according to FIG. 2 the pivot angle in the horizontal direction is approximately 30°.

Figure 2:
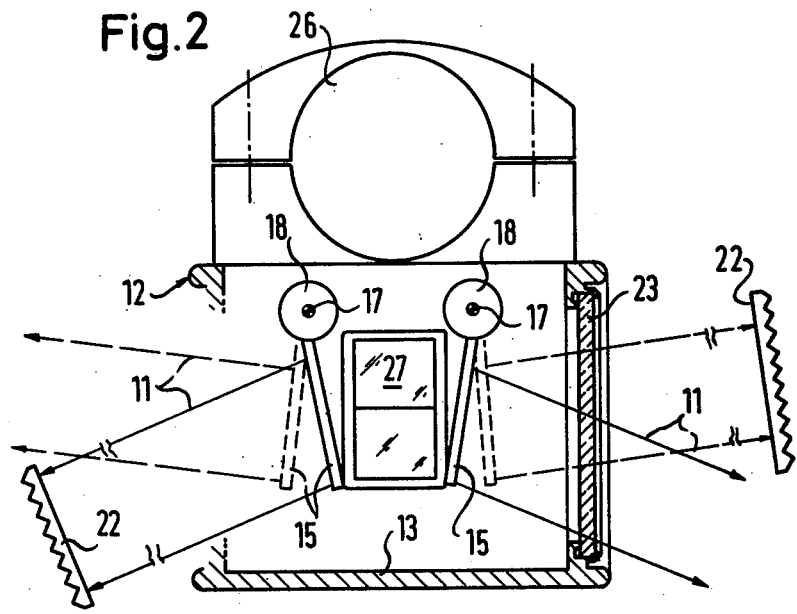
FIG. 2, a schematic horizontal section of the embodiment of FIG. 1.

In the pivot range of the light barrier beams 11, windows 23 are provided in the wall of casing 13, whereof only one is shown in FIGS. 1 and 2.

A retroreflector 22 is provided on the sides of the door opening facing casing 13, whereby in FIGS. 1 and 2 the retroreflector is shown purely schematically and at much too small a distance from casing 13.

The light is reflected by retroreflector 22 and passes via the same passive reflector 15 and the same condenser system 25 to a photo-receiver 20 located adjacent to light source 21.

FIG. 2 shows the opening 26 by means of which casing 13 can be fixed to a handrail. The adjustment of the passive reflector 15 relative to the retroreflectors 22 takes place after securing casing 13 and with the latter open.

In FIGS. 3 and 4 the same reference numerals are used to designate the same parts as in FIGS. 1 and 2. However, the difference in the embodiment of FIGS. 3 and 4 is that the passive reflector 15 according to FIGS. 1 and 2 is omitted and in place of this the light transmitters 14 comprising light source 21 and condenser 25 are fixed to a common plate 19 which in turn is arranged in casing 13 so as to pivot about a horizontal spindle 16 and a vertical spindle 17. According to FIG. 4 the two light transmitters 14 are also superimposed so that the light emergence windows 23, whereof only one is shown in FIGS. 3 and 4, are staggered relative to one another heightwise. The operation of the embodiment of FIGS. 3 and 4 is the same as that of FIGS. 1 and 2.

In FIGS. 3 and 4 the light receiver is not shown but analogously to the embodiment of FIGS. 1 and 2 it can be combined with the light transmitter according to the autocollimation principle.

Thus, according to the invention, the light beam direction is infinitely adjustable in the vertical and horizontal directions. Casing 13 can be constructed in identical manner no matter whether one light transmitter is provided for the beams to the left, one light transmitter for the beams to the right or two light transmitters for the beams in opposite directions.

In the embodiment according to FIGS. 1 and 2 a further light transmitter 14 with photo-receiver 20 is preferably provided between the two outer light transmitters 14, whereby the optical axis 28 of the former is positioned vertically and which emits upwardly through a window 27 provided in the top to a retroreflector 22 arranged on the roof of the vehicle or on the top of the door.

The invention is not limited to the embodiments described and represented hereinbefore and various modifications can be made thereto without passing beyond the scope of the invention.

What is claimed is:

1. A door securing light barrier system comprising: a casing, a plurality of optically active devices in said casing adapted to direct a light barrier beam through at least a part of a door opening, and including at least one light beam transmitting device fixed in said casing, and a passive reflector pivotable about two axes perpendicular to each other for adjusting the angle of the light beam of the light beam transmitting device relative to said casing, one of said devices emitting an electrical signal when the light barrier beam is broken, said light beam transmitting device being combined with a light receiver in an autocollimation system, said casing being adjustable along a vertical axis and being pivotable about said vertical axis.

2. A light barrier as claimed in claim 1, wherein the passive reflector is mounted in a ball and socket joint.

3. A light barrier as claimed according to claim 1, wherein the light transmitting device emits a light beam directed substantially perpendicularly to the light barrier beam and which is deflected by substantially 90° by the passive reflector.

4. A light barrier as claimed as claim 1, wherein two light transmitting devices emitting in opposite directions are arranged in said casing.

5. A light barrier as claimed in claim 1, comprising windows in the area where the light barrier beam passes out of the casing.

6. A light barrier as claimed in claim 5, wherein the windows are constructed as filters.

7. A light barrier as claimed in claim 1, wherein the light transmitting devices and passive reflector are juxtaposed.

8. A light barrier as claimed in claim 1, wherein the light beam is vertically adjustable by approximately 40° and horizontally adjustable by approximately 30° by said adjusting means.

9. A light barrier as claimed in claim 1, comprising a vertically emitting light transmitter and a superposed retroreflector which cooperates with said vertically emitting light transmitter.

10. A door securing light barrier system, comprising: a casing, a plurality of optically active devices in said casing and adapted to direct to light barrier beam through at least part of a door opening, including a light beam transmitting device pivotally arranged in said casing and pivotable about two axes arranged perpendicularly with respect to each other for adjusting the angle of the light beam of the light beam transmitting device relative to said casing, one of said devices emitting an electrical signal when the light barrier beam is broken, said light beam transmitting device being combined with a light receiver in an autocollimation system, and said casing being adjustable along a vertical axis and being pivotable about said vertical axis.

11. A light barrier as claimed in claim 10, comprising a pivotable plate and wherein the light transmitting device is fixed to said pivotable plate.

12. A light barrier as claimed in claim 10, wherein two light transmitting devices emitting in opposite directions are arranged in said casing.

13. A light barrier as claimed in claim 12, wherein the light transmitting devices are superimposed.

14. A light barrier as claimed in claim 10, wherein the light beam is vertically adjustable by approximately 40° and horizontally adjustable by approximately 30° by said adjusting means.

* * * * *